United States Patent [19]

Brassine

[11] 4,340,372
[45] Jul. 20, 1982

[54] EDUCATIONAL AID

[76] Inventor: Robert L. Brassine, 3421 Glenn-Don, #2, Anchorage, Ak. 99504

[21] Appl. No.: 141,014

[22] Filed: Apr. 17, 1980

[51] Int. Cl.³ .............................................. G09B 11/04
[52] U.S. Cl. ..................................... 434/88; 434/415; 434/426; 40/546
[58] Field of Search .......................... 312/230; 40/546; 434/77, 88, 408, 415, 416, 432

[56] References Cited

U.S. PATENT DOCUMENTS

| | | |
|---|---|---|
| 1,440,096 | 12/1922 | Murray . |
| 1,559,665 | 11/1925 | Beery ..................................... 434/88 |
| 1,707,965 | 4/1929 | Scantlebury . |
| 1,931,742 | 10/1933 | Scharringhausen . |
| 2,317,336 | 4/1943 | Adams .............................. 434/77 X |
| 2,358,203 | 9/1944 | Best ................................... 40/546 X |
| 2,566,458 | 9/1951 | Macau . |
| 2,644,935 | 7/1953 | Greenwald . |
| 3,215,453 | 11/1965 | Malcom . |
| 3,384,986 | 5/1968 | Davis . |
| 3,905,141 | 9/1975 | Chichester . |
| 4,104,810 | 8/1978 | Mirman .............................. 434/77 X |

OTHER PUBLICATIONS

U.S. Air Force Dispatch board cited by applicant.

Primary Examiner—Harland S. Skogquist
Attorney, Agent, or Firm—William D. Hall

[57] ABSTRACT

An educational device utilizing light as the displaying medium is provided. The device has a light-impervious housing having a hole in the top and a light source therein. There is a plexiglass panel inside said housing, accessible through the hole in the top of the housing. The light source is located directly offset one edge of the plexiglass panel such that light rays from said light source enter the plexiglass panel through this edge and are entrapped therein. The housing also has slits in the sides thereof directly below the plexiglass panel so that paper inserts can be placed inside the housing directly beneath the plexiglass panel. The device is employed by turning on the light and by either inserting materials into the above-described slit or by writing on the outer surface of the plexiglass panel with a grease pencil. The light entrapped in the plexiglass panel will escape thru the top of the plexiglass panel and illuminate the inserts and the writing for the user's viewing.

2 Claims, 5 Drawing Figures

EDUCATIONAL AID

This invention relates to display means for educational materials. More particularly, this invention relates to display means for educational materials wherein an image is displayed thru the use of an edge-lighted plexiglass panel.

BACKGROUND OF THE INVENTION

One of the major obstacles that a teacher of young children must overcome to successfully teach his/her students is their short attention span and lack of concentration. A teacher of young children thus tries to use special educational aids such as cardboard displays or overhead projectors to captivate and keep his/her students' attention. Such educational aids are usually limited to the teacher using these aids while the students sit still and just watch and/or listen. While this type of teaching enables the teacher to better attract and keep the attention of young school children than having the teacher stand up and lecture, it still does not provide any direct involvement and participation by the students. Thus, even educational aids used primarily by the teacher have a limited ability to captivate and keep students' attention because of the limited participation by the students.

Students, of course, have their own text books, workbooks, etc., to refer to while the teacher is talking and to study during the time allotted during the day for individual study. These printed materials, however, do not usually captivate the students' attention since the students have had printed materials at their disposal since early in their childhood.

It is extremely important during the early educational years of a child that a maximum effort by school personnel is exerted to get the child involved in his school work as the child's basic attitude towards education is being formulated at the time. Many children may do poorly in school throughout their educational years, even though they possess the capability to do much better work, because they received a poor start in the educational stepladder. Such should be prevented by making early schoolwork as interesting and fun as possible so that the child has a positive attitude towards learning. Current educational aids do not entirely fulfill this need.

Thus, it is apparent from the above that there exists a need in the art for an educational aid that will captivate a young student's attention and that can be used individually by students.

This invention fulfills this need and many other needs apparent to the skilled person in the relevant art once given the following disclosure.

SUMMARY OF THE INVENTION

This invention captivates and keeps a child's attention by providing a light table-like mechanism that can illuminate items (e.g., construction paper inserts, etc.) that the child can insert in the table or markings the child can make on the top surface of the table. The invention is a new approach in educational aids that can be used on an individual basis or in a group situation with the school teacher or another individual as the group leader.

The invention can be built on a large scale and used in the front of the classroom much like chalkboards are now used. The invention can also be practiced by building portable devices according to the invention (as shown in the drawings) which are small enough to be easily placed on the tops of desks and tables for use.

Two embodiments of this invention are described below and illustrated in the drawings, an embodiment which has means to receive and be used with scrolls and/or flat paper inserts, and an embodiment that can only receive flat paper inserts. In either embodiment, the child has the option of using grease pencils, or other similar markers, and writing on the plexiglass panel of the device in addition to, or instead of, using the inserts or scrolls. In either of these embodiments, the child turns on the light contained in the device and inserts either an insert or a scroll into the invention, or employs the device by writing on the plexiglass panel. The light will illuminate the plexiglass panel. The images contained on these inserts or scrolls and the grease pencil markings will be illuminated for the student to see as follows. Since the top surface of the device is a clear plexiglass panel having some of the light rays from the fluorescent bulb captivated therein, any foreign matter on the surface of the plexiglass sheet, as well as paper which is in contact or immediately adjacent to the panel, will be illuminated. Thus, a young student can utilize grease pencils to mark on the plexiglass panel and these markings will be illuminated by the light escaping therethrough from the plexiglass panel. Since plexiglass cleans very easily, the grease pencil markings can be easily removed.

While it is possible to practice this invention with the lights of the classroom on, it would be best if the classroom was darkened while this invention was being practiced for better light contrast. This would also help increase the student's attention span since other distractions would be eliminated.

This invention has many advantages over the educational devices now employed in the education of school children.

One advantage of this invention is that it provides a captivating educational aid for use by each individual student so that each student can progress with the teaching materials compatible with the devices according to this invention at his/her own learning rate.

A further advantage of this invention is that it provides a captivating educational aid that is portable and can sit on the tops of most tables and desks, thus, being convenient and easy to use. The devices can be moved off the desks or tables when they are not being used.

Yet another advantage of this invention is that it provides a clean, easy apparatus for employment by a young student when doing schoolwork that requires repetitious writing. Stated differently, this invention provides a reusable surface where the removal of the old markings is a relatively clean process not involving chalk dust, etc. The old grease pencil markings can be easily removed from the surface of the plexiglass panel by a soft cloth.

It is also an advantage of this invention that the devices according to this invention can be utilized in a number of ways and that the materials being illuminated can be easily and quickly changed.

A further advantage of this invention is the fact that maintenance of the device is very inexpensive and easy since the light bulb is easily accessible after removing the grease pencil compartment.

Another advantage of the device according to this invention is that some embodiments of the device provide storage compartments for the materials that can be used with the device.

Generally speaking, this invention provides a display device comprised of a clear transparent panel having first and second faces and having the characteristic that light which permeates a side wall thereof will emit through a face of the panel when a foreign object is brought into contact with the face, a side wall of said transparent panel being directed at a light source so that light enters the panel thru this side wall, and means to support said transparent panel such that a person can write on said first face, said support means including means to bring materials into contact with said second face of said panel.

Certain embodiments of this invention will now be described by reference to the accompanying drawings wherein:

IN THE DRAWINGS

DETAILED DESCRIPTION OF THE DRAWINGS

Figure 1:
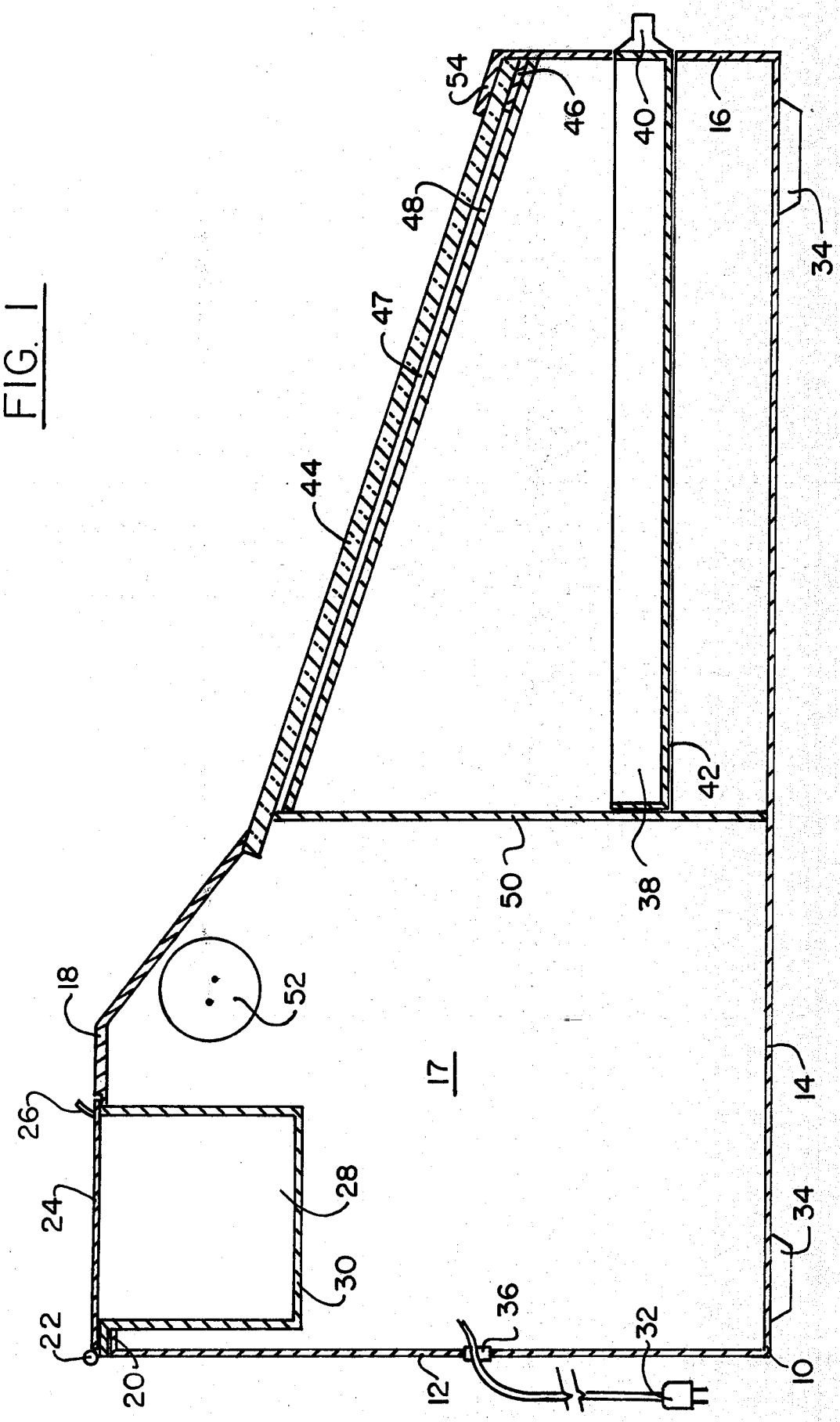
FIG. 1 is a sectionalized side view of one embodiment of this invention, this embodiment capable of being used with flat paper inserts, but not scrolls.

Referring to the accompanying drawings, two embodiments of the invention are illustrated. The second embodiment (FIGS. 2-5) is capable of being used with scrolls and flat paper inserts while the first illustrated embodiment (FIG. 1) can only be used with flat paper inserts (and, of course, grease pencils or other similar markers). Basically the configurations are comprised of the same elements. The differences between the embodiments, which are minor, in the two basic configurations will be later described. Thus, the description that follows applies to both configurations, except where noted.

Housing 10 is comprised of back panel 12, bottom panel 14, front panel 16, top panel 18, side panels 15 and 17, lip panel 20, side overhang panels 60, and front overhang panel 54. All of these panels are flat and are made of light-impervious material so that light cannot escape from the housing thru these panels. Plexiglass panel 44 (or any other transparent material which passes the above-described light-emitting characteristic) is located in the hole defined by top panel 18, side overhang panels 60, and front overhang panel 54 and is retained in this hole, in part, by these panels.

Fluorescent light bulb 52 is located under top panel 18 and is attached to fluorescent light bulb socket units 56 which are, in turn, attached to side panels 15 and 17. Fluorescent light bulb 52 is positioned relative to plexiglass panel 44 such that one end of plexiglass panel 44 is directed at fluorescent light bulb 52. This positioning substantially restricts the entry of light from fluorescent light bulb 52 into plexiglass panel 44 to the light rays entering the end of plexiglass panel 44 pointed at fluorescent light bulb 52. The ends of plexiglass panel 44 not pointed at the light bulb 52 can be coated with a non-transparent coating to improve the performance of the device.

Plexiglass panel 44 is supported by support 50 on one end and by plexiglass panel support strip 46 at the other end. Plexiglass panel support strip 46 in turn rests on background plate 48 which is fixably attached to side panels 15 and 17. In this embodiment, support 50 is a plate that runs the entire width of housing 10, and support strip 46 is of a width equal to plexiglass panel 44. The purpose of plexiglass panel support strip 64 is to provide insert gap 47 between background plate 48 and plexiglass panel 44 for the insertion of the inserts and scrolls that can be used with this device.

Background plate 48 can be made of any material sturdy enough to support plexiglass panel 44 and the inserts and scrolls that are to be used with this invention. The top surface of background plate 48 should preferably be of a dark color to provide a dark background for the images which will be illuminated by plexiglass panel 44.

This educational device also provides crayon compartment 28 for storing the grease pencils, crayons, etc., which can be used to mark on the upper surface of plexiglass panel 44. Crayon compartment 28 is comprised of top panel 24 and compartment body 30. Compartment body 30 is also comprised of a transparent material such as plexiglass so that crayon compartment 28 will be illuminated when light bulb 52 is turned on. Thus, when a child using this device is choosing which crayon, grease pencil, etc., the child wants to use, the markers will be illuminated. Top panel 24 is rotatably attached to compartment body 30 by hinge 22. The child user gains access to crayon compartment 28 by swinging open top panel 24. Top panel 24 has finger grip 26 attached near the edge opposite hinge 22 so that top panel 24 can be more easily opened. Top panel 24 is preferably comprised of a light impervious material so that light does not escape therethrough and interfere with the images displayed by the light within plexiglass panel 44.

Figure 2:
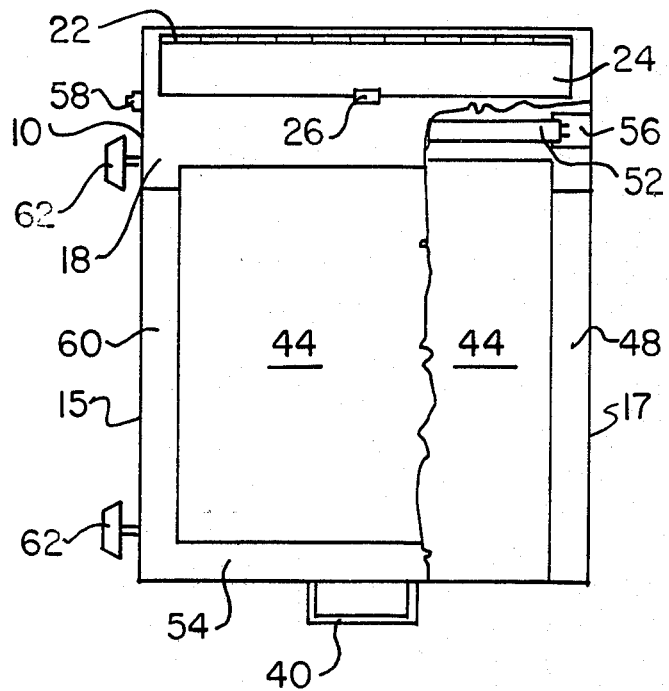
FIG. 2 is a plan view, partially sectionalized, of another embodiment of this invention, this embodiment capable of being used with flat paper inserts and scrolls.
Figure 3:
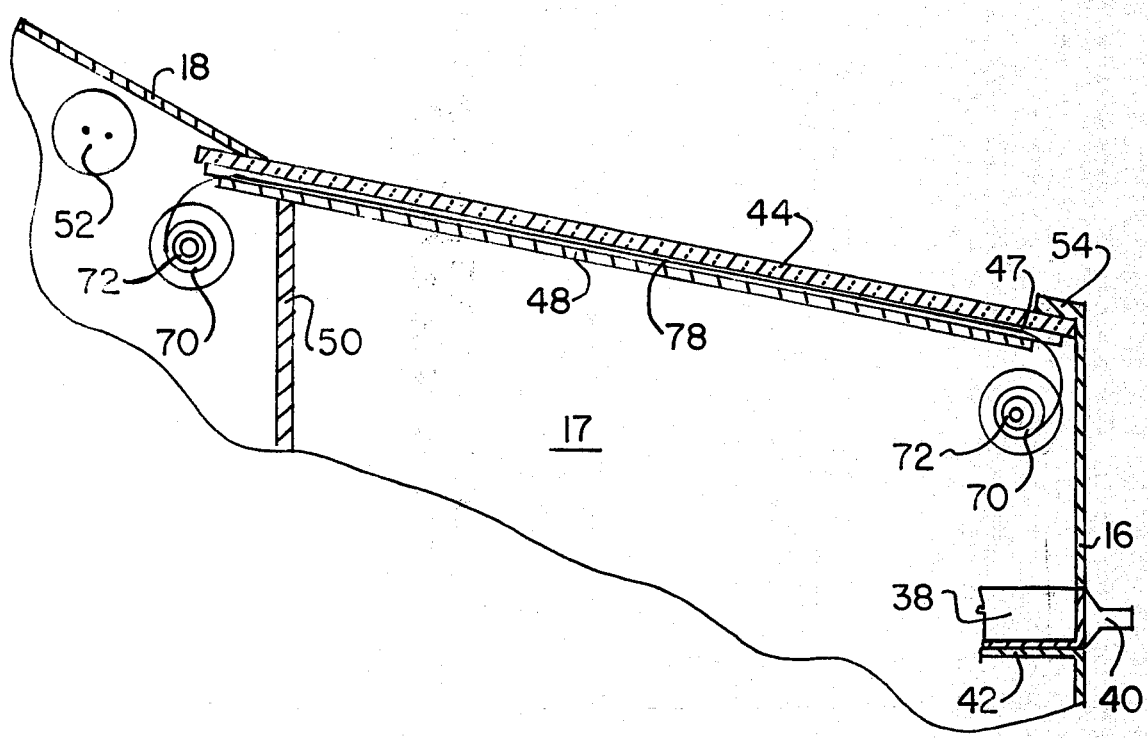
FIG. 3 is a partial sectionalized side view of the embodiment illustrated in FIG. 2.

In these embodiments, crayon compartment 28 is designed to rest on the edges of lip panel 20 and top panel 18 as shown in FIG. 1 without being connected to any part of housing 10. Thus, crayon compartment 28 can be easily lifted out of housing 10 when it is necessary to replace fluorescent light bulb 52. As shown in FIGS. 1 and 2, the opening left in housing 10 when crayon compartment 28 is removed is of sufficient size for a person to easily reach in and replace fluorescent light bulb 52 thru the opening.

The fluorescent light bulb 52 is operated by on-off switch 58 which is embedded in side panel 15. Power is supplied to this device by plugging plug 32 into an ordinary wall outlet. The wiring connecting plug 32 with on-off switch 58 and socket units 56 enters housing 10 thru grommet 36, which is embedded in back panel 12.

Also, in the first embodiment of this invention (see FIG. 1), drawer 38 is provided for greater storage space. Drawer 38 is received by drawer supports 42 and can be of various dimensions, depending on the amount of storage space desired. Drawer supports 42 are two spaced strips of material extending from support 50 to front panel 16 and attached thereto. When pushed in all the way, the back of drawer 38 interfaces with support 50. Handle 40 is attached to the front of drawer 38.

Even if drawer 38 is not included in the device, it may still be desirable to attach handle 40 to front panel 16 to facilitate the carry of the device.

Rubber pads 34 are attached to bottom panel 14 so that the device does not mark up the surface on which it is placed.

The embodiments of this invention which are designed to be used only with flat paper inserts and grease pencils or other similar markers are exemplified by FIG. 1. In FIG. 1, as previously discussed, insert gap 47 is formed between plexiglass panel 44 and background plate 48 when the device is properly assembled. There are slits in side panels 15 and 17 which line up with insert gaps 47 such that insert gap 47 runs the entire width of the educational aid.

Thus, to employ the device as shown in FIG. 1, a young student would first have to turn on the device by on-off switch 58. Then the student can put construction paper inserts (or other inserts made out of other suitable materials) into insert gap 47. The light within plexiglass panel 44 and insert gap 47 will illuminate the insert, providing the child with a unique method of learning new material. In the alternative, or in combination with the inserts, the child can remove a grease pencil from crayon compartment 28 and write on the top surface of plexiglass panel 44.

Figure 4:
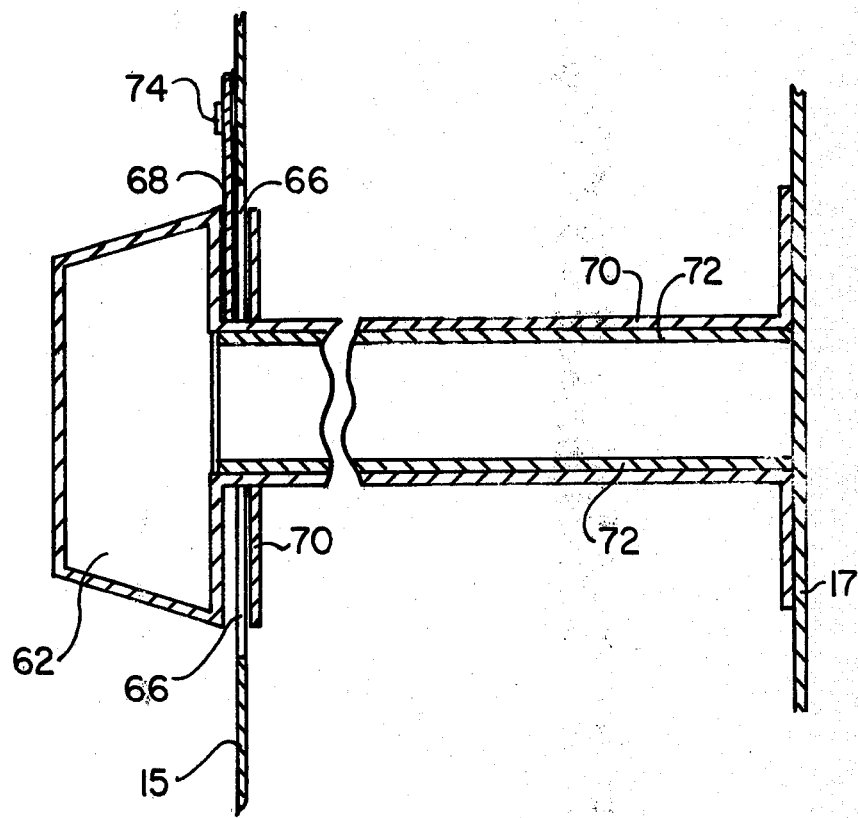
FIG. 4 is a sectionalized side view of the scroll spools, spool lock, and spool guides of the embodiment of this invention illustrated in FIG. 2.

FIGS. 2–5 illustrate an embodiment of this invention that can be used with scroll-type inserts, as well as flat paper inserts. Scroll 78 has two spools 70. Spools 70 have knobs 62 spaced from one of the end pieces as shown in FIG. 4. Spool guides 72, which are cylindrically shaped, are fixedly attached, on end, to side panel 17. Side panel 15 has holes 66 cut therein directly in line with spool guides 72.

Scroll 78 is used with this embodiment as follows. Spools 70 are placed, thru hole 66 in side panel 15, on spool guides 72, with knobs 62 extending out side panel 15. Scroll 78 is placed in insert gap 47 which runs the entire width of the device as in the previous embodiment. When light 52 is turned on, the scroll will be illuminated enabling the user to easily view its contents. The scroll can then be unwound or wound by turning knobs 62 simultaneously in either direction.

Figure 5:
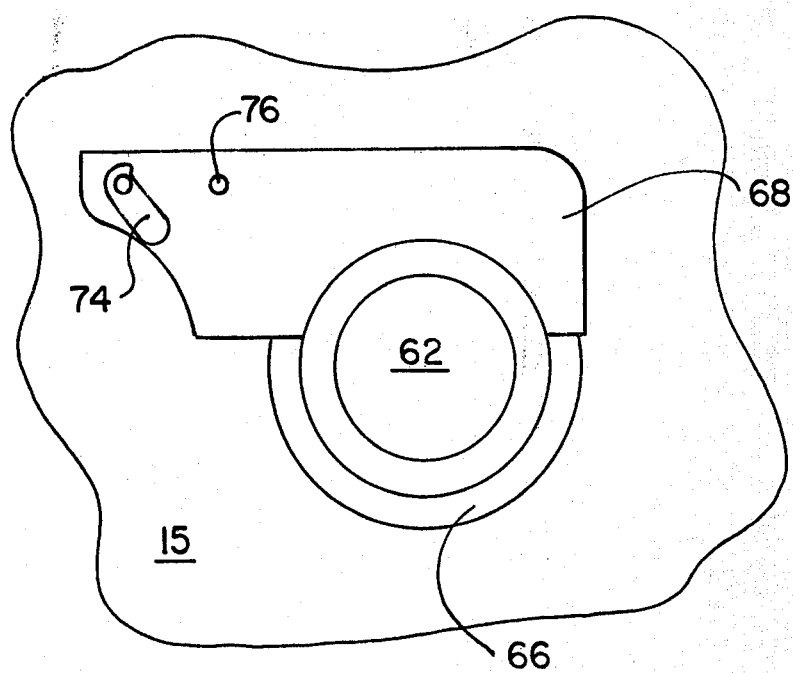
FIG. 5 is a side view of the embodiment illustrated in FIG. 2 showing a spool lock in the lock position and the end of a spool.

This embodiment also has spool lock 68 to hold spool 70 in place while the user is operating the device. Spool lock 68 is rotatably attached to side panel 15 by pivot tube 76. Finger actuator 74 is fixedly attached to spool lock 68. FIGS. 4 and 5 show spool lock 68 in the lock position. Spool lock 68 fits into the space between knob 62 and the adjacent end piece of spool 70 so that spool 70 cannot freely slide along spool guide 72 when spool lock 68 is in the lock position.

To remove spools 70, spool lock 68 is moved from the lock position to the open position by rotating spool lock 68 around pivot tube 76 in a clockwise direction. Finger actuator 74 is provided for this purpose.

Flat paper inserts and grease pencils as well as scrolls can be used with this embodiment in the same manner as in the first embodiment previously described.

It is possible to build a device according to this invention on a much bigger scale than illustrated in the figures. For example, a large scale embodiment of this invention could be employed in front of the class by the teacher, the same as chalkboards are now used.

Once given the above disclosure, other features, modifications, and improvements will become apparent to one skilled in the art. Such features, modifications, and improvements are therefore considered to be within the scope of this invention.

I claim:

1. A display device utilizing light as a display medium comprising:

a transparent panel having a first face, a second face, and a side wall and having the characteristic that light entering said panel through said side wall will be emitted through said first face at least when a foreign object is in contact with either of said faces, the longitudinal plane of said transparent panel being in line with a source of light such that said side wall of said transparent panel is permeated by light from said source, a housing having a hole in one face thereof, said transparent panel being located within said housing in a position in relation to said hole that enables human access to said first face for writing or drawing on said first face, a background plate located in said housing and spaced below said transparent panel such that a plate-shaped gap to receive materials to be illuminated by said device is formed between said background plate and said transparent panel, wherein said housing has a slit in the side thereof to receive said materials and, a crayon container, said housing having a hole in the top thereof to receive said crayon container, said crayon container having upper lips extending therefrom to rest on said housing, wherein said crayon container has a light-impervious lid rotatably attached to a substantially transparent body, said crayon container being located adjacent to said light source so that the walls of said crayon container are illuminated by said light source.

2. A display device according to claim 16 wherein the hole in the top surface of said housing is of sufficient size so that said light source can be removed from said housing therethrough, and wherein said crayon container is easily removable from said housing.

* * * * *